United States Patent
Fujieda et al.

(10) Patent No.: US 8,564,655 B2
(45) Date of Patent: Oct. 22, 2013

(54) THREE-DIMENSIONAL MEASUREMENT METHOD AND THREE-DIMENSIONAL MEASUREMENT APPARATUS

(75) Inventors: Shiro Fujieda, Kyoto (JP); Hiroshi Yano, Toyonaka (JP); Yasuyuki Ikeda, Ikeda (JP)

(73) Assignee: Omron Corporation, Kyoto-shi (JP)

( * ) Notice: Subject to any disclaimer, the term of this patent is extended or adjusted under 35 U.S.C. 154(b) by 1231 days.

(21) Appl. No.: 12/230,442

(22) Filed: Aug. 28, 2008

(65) Prior Publication Data
US 2009/0059242 A1  Mar. 5, 2009

(30) Foreign Application Priority Data
Aug. 29, 2007  (JP) ............................... P2007-222356

(51) Int. Cl.
*G03B 7/00* (2006.01)
(52) U.S. Cl.
USPC .................................. 348/87; 348/91; 348/92
(58) Field of Classification Search
USPC .......................................... 702/150; 382/167
See application file for complete search history.

(56) References Cited

U.S. PATENT DOCUMENTS

2004/0128102 A1* 7/2004 Petty et al. .................... 702/150
2008/0253649 A1* 10/2008 Wang et al. ................... 382/167

FOREIGN PATENT DOCUMENTS

| JP | 2000-039566 | 2/2000 |
| JP | 2006-349586 | 12/2006 |
| JP | 2007-206211 | 8/2007 |

\* cited by examiner

*Primary Examiner* — Firmin Backer
*Assistant Examiner* — Keyvan Emdadi
(74) *Attorney, Agent, or Firm* — Foley & Lardner LLP

(57) ABSTRACT

Images of a work piece in which measurement object is restricted to a specific point or domain are taken by a camera which takes the image of the work piece from a front-view direction and a camera which takes the image from obliquely above, and a height of each measurement object region is measured. Each pixel of the front-view image used in measurement processing is virtually disposed in a three-dimensional coordinate system including x- and y-axes constituting a coordinate system of the image and a z-axis indicating the height, and a perspective transform is performed to produce a processing result image expressing measurement result. A measurement value is set as the z-coordinate at the pixel which is a height measurement object, and the z-coordinates of other pixels are set at other pixels. A mark for identifying a position and an auxiliary line indicating the height are set at measurement object points and measurement object region in the image.

11 Claims, 7 Drawing Sheets

THREE-DIMENSIONAL MEASUREMENT METHOD AND THREE-DIMENSIONAL MEASUREMENT APPARATUS

This application claims priority from Japanese patent application P2007-222356, filed on Aug. 29, 2007. The entire content of the aforementioned application is incorporated herein by reference.

BACKGROUND OF THE INVENTION

1. Field of the Invention

The present invention relates to a method for performing three-dimensional measurement to a measurement object having a predetermined shape with an optical three-dimensional measurement unit and a three-dimensional measurement apparatus to which the method is applied.

2. Description of the Related Art

In the conventional three-dimensional measurement apparatus, there is an apparatus having a function of computing many three-dimensional coordinates for a measurement object and displaying a three-dimensional image based on the computed coordinates. For example, Japanese Patent Application Laid-Open No. 2000-39566 discloses a microscope enlargement observation system provided with a microscope lens-barrel and an imaging device, in which height information on each pixel included in an imaging object domain is obtained by synthesizing plural focused focal point domains, and an image expressing a state in which three-dimensional image data formed by a pixel group to which the height information is imparted is observed from various directions is displayed.

In the system disclosed in Japanese Patent Application Laid-Open No. 2000-39566, a measurement object is a whole region included in a visual field of the imaging unit. However, frequently the region where the measurement is required is restricted in a production line or an inspection line of a plant. Because of the need for enhancing processing in in-line measurement, there is a strong demand for the three-dimensional measurement restricted to the region where the measurement is required. At the same time, for output of the measurement result, there is also a demand not only for simply supplying numerical information but also for being able to easily confirm the measurement result from the view of a user.

An object of the invention is to satisfy the above demand by displaying the image simply expressing the measurement result while the measurement result is correlated with an overall image of the measurement object even if the object region of the three-dimensional measurement in the measurement object is restricted.

SUMMARY OF THE INVENTION

A three-dimensional measurement method of the present invention for observing a measurement object is one, in which one or plural measurement object regions are previously defined, with an optical three-dimensional measurement unit to compute a coordinate for each measurement object region, a coordinate indicating a position relative to a reference plane facing at least the measurement object region.

In the method of the invention, a three-dimensional measurement apparatus provided with plural cameras in which a stereo method is adopted, a three-dimensional measurement apparatus in which a light-section method is adopted, and a displacement sensor can be used as the "optical three-dimensional measurement unit". The "predetermined reference plane facing the measurement object region" is a plane which supports, for example, the measurement object. The "predetermined reference plane facing the measurement object region" is not limited to the actually-existing plane, but a virtual plane which is set at the back of or in front of the measurement object region may be set to the reference plane.

For example, when the support surface of the measurement object region is set to the reference plane to observe the measurement object from obliquely above with an optical three-dimensional measurement unit, the coordinate indicating the position relative to the reference plane expresses the height of the measurement object region.

On the other hand, when the region such as a recess and a step portion which is recessed from the surroundings is measured, the virtual plane is set in accordance with the height around the measurement object region, and the virtual plane may be set to the reference plane.

In the three-dimensional measurement method of the invention, an image of the measurement object is taken to produce a two-dimensional image; a coordinate is set at a pixel corresponding to the measurement object region in the two-dimensional image, the coordinate indicating the position relative to the reference plane; a constant value is set at another pixel, the constant value being of the coordinate indicating the position relative to the reference plane. Each of the set pixels is virtually disposed in a three-dimensional space, the three-dimensional space being formed by two axes constituting a coordinate system of the two-dimensional image and an axis indicating the position relative to the reference plane; a perspective transform is performed to each pixel from a predetermined direction; and a two-dimensional image produced by the perspective transform is processed and displayed such that the measurement object region can be distinguished from another region.

According to the method of the invention, the z-coordinate computed by the three-dimensional measurement is set at the pixel corresponding to the measurement object region in the pixels constituting the two-dimensional image, and the constant value $z_0$ (for example, $z_0=0$) is set as the z-coordinate at the pixels except out of the measurement object region. The z-coordinate is set at each pixel, and the perspective transform is performed while the pixels are disposed in the virtual three-dimensional space having the x-, y-, and z-axes, so that an image having depth feel can be produced for the region which is not the measurement object while the measurement object region is projected at the site reflecting the magnitude of the z-coordinate.

Additionally, the image produced by the perspective transform is processed and displayed such that the measurement object region can be distinguished from other regions, so that the user can easily confirm the three-dimensional measurement result in the visual manner while recognizing the relationship between the measurement object region and the surroundings thereof.

It is not always necessary that the image which becomes the perspective transform processing object includes the overall image of the measurement object. However, desirably the image which becomes the perspective transform processing object includes the whole regions which is set at the three-dimensional measurement object, and also includes the region which is not the measurement object in a sufficiently wide range.

Further, in the three-dimensional measurement method of the invention, preferably a front-view image which is produced by taking an image of the measurement object from a front direction is set at the perspective transform object image, a manipulation for setting a perspective transform direction based on a front-view direction is accepted while the front-view image is displayed, and the perspective transform is performed to a pixel group from a direction indicated by an angle set by the manipulation, the pixel group being virtually disposed in the three-dimensional space.

Accordingly, because the perspective transform image is produced from any direction set by the user, a degree of freedom is enhanced when the measurement result is confirmed. The image close to the image intended by the user can be displayed, because the perspective transform is performed based on a direction which is set based on a state in which measurement object is viewed from a front side.

Further, in the three-dimensional measurement method of the invention, preferably, after a coordinate corresponding to each measurement object region is specified in plural two-dimensional images with an apparatus which of the optical three-dimensional measurement unit for performing three-dimensional measurement using the plural two-dimensional images produced by plural cameras, a coordinate indicating a position relative to the reference plane is computed using the specified coordinate. Additionally, for one of the two-dimensional images used in the three-dimensional measurement, the coordinate computed as a coordinate indicating a position relative to the reference plane is set at a pixel whose coordinate is specified as the coordinate corresponding to the measurement object region, the constant coordinate is set at other pixels as a coordinate indicating a position relative to the reference plane, and the perspective transform processing is performed.

Accordingly, while the three-dimensional measurement processing in which the plural cameras are used is performed, one of the two-dimensional images used in the three-dimensional measurement is set to the perspective transform object, the measured z-coordinate is set at the pixel actually used in the three-dimensional measurement, and the perspective transform is performed. Therefore, the user can easily determines whether or not the region set at the three-dimensional measurement object is correct or whether or not the measurement value is proper.

A three-dimensional measurement apparatus of the present invention includes plural cameras which are disposed while a positional relationship and an optical axis direction are defined such that visual fields of the cameras are overlapped in a predetermined range; an image input unit into which plural two-dimensional images are fed, the plural two-dimensional images being produced by taking an image of a measurement object entering the range where the visual fields of the cameras are overlapped using the cameras; a measurement unit which extracts a coordinate of a corresponding point in each input image for predetermined one or plural measurement object regions of the measurement object, and the measurement unit computing a coordinate indicating a position relative to a reference plane facing at least the measurement object region using each extracted coordinate; a processing result image production unit which produces a two-dimensional processing result image expressing the measurement result of the measurement unit; and a display unit which displays the processing result image.

In the three-dimensional measurement apparatus of the invention, for a specific image in plural two-dimensional images used to measure the measurement unit, the processing result image production unit sets the coordinate computed as the coordinate indicating the position relative to the reference plane at a pixel whose coordinate corresponding to the measurement object region is extracted by the measurement unit in each constitutional pixel in the specific image, the processing result image production unit sets a constant value as the coordinate indicating the position relative to the reference plane at other pixels. Then, the processing result image production unit virtually disposes the set pixels in a three-dimensional space, the three-dimensional space including two axes constituting a coordinate system of the specific image and an axis indicating the position relative to the reference plane, and the processing result image production unit performs a perspective transform to each pixel from a predetermined direction, and processes the perspective transform image such that the measurement object region can be distinguished from other regions to produce a processing result image.

In the three-dimensional measurement of the invention, the three-dimensional measurement is accurately performed to each measurement object region using the images produced by the plural cameras, and the magnitude of the z-coordinate of the pixel used in the actual three-dimensional measurement can be displayed with the depth feel of the surroundings by the perspective transform processing in which the specific image used in the measurement is used.

Further, in the three-dimensional measurement apparatus of the invention, preferably the three-dimensional measurement apparatus further includes a manipulation unit which performs manipulation for setting an angle indicating a perspective transform direction based on a front-view direction while a specific one of the plural cameras is disposed so as to take an image of the measurement object from the front-view direction. In the three-dimensional measurement apparatus of the invention, the processing result image production unit displays a front-view image of a measurement object produced by the specific camera on the display unit, the processing result image production unit accepts setting manipulation of the manipulation unit while the front-view image is displayed on the display unit, and the processing result image production unit performs the perspective transform to a pixel group virtually disposed in the three-dimensional space from a direction indicated by the angle set by the manipulation.

Accordingly, the perspective transform image is produced from any direction set by the user, so that a degree of freedom is enhanced when the measurement result is confirmed. The image close to the image intended by the user can be displayed, because the perspective transform is performed based on the direction which is set based on the state in which measurement object is viewed from the front side.

In the three-dimensional measurement method and three-dimensional measurement apparatus of the invention, even if the result expressing the overall three-dimensional figure of the measurement object is not obtained because the measurement object region is restricted, the image which confirms a relationship between the measurement object region and the surrounding or whether or not the correct region is measured can be displayed while magnitude of the coordinate obtained by the three-dimensional measurement is confirmed, and user-friendliness can be improved.

DETAILED DESCRIPTION OF THE PREFERRED EMBODIMENTS

Figure 1:
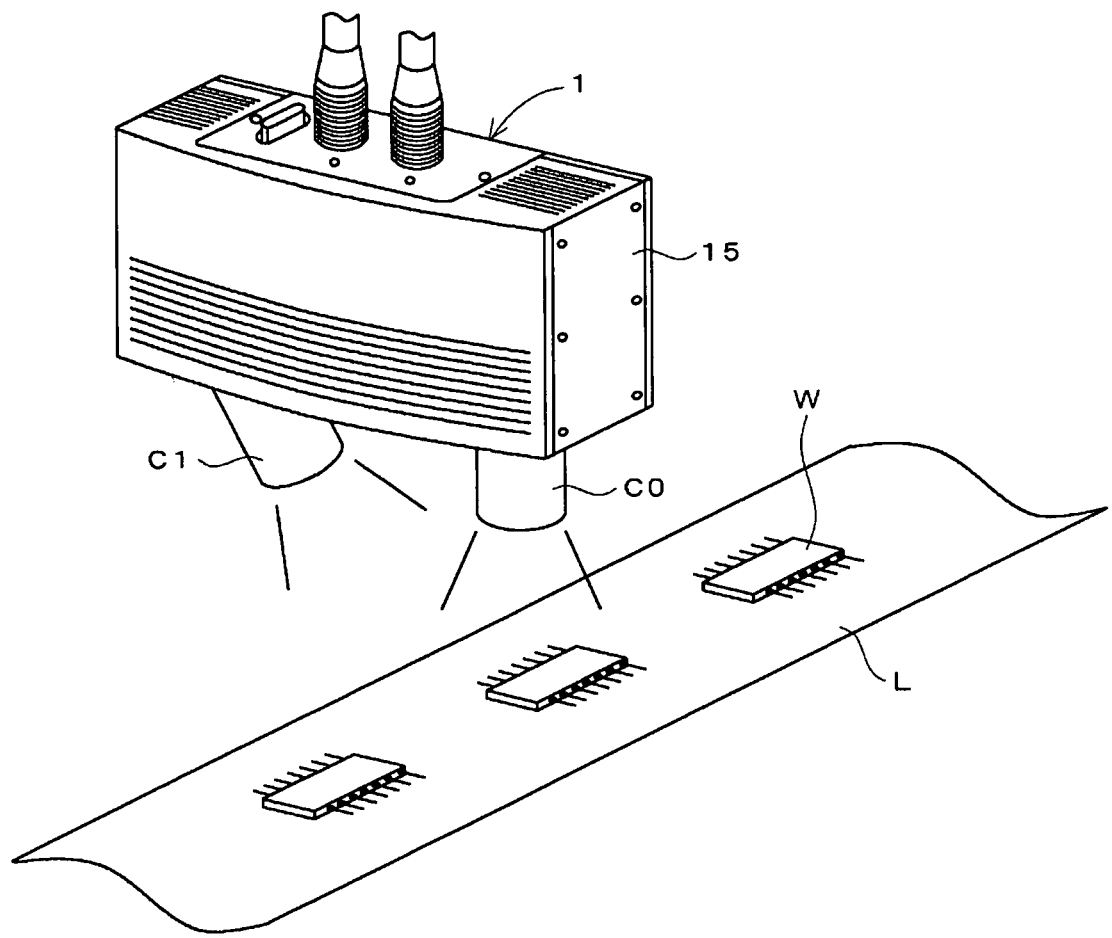
FIG. 1 shows a perspective view of a configuration and a placement example of an imaging device.

FIG. 1 shows a configuration and a placement example of an imaging unit of a three-dimensional measurement apparatus according to a first embodiment of the invention.

In the three-dimensional measurement apparatus of the embodiment, an imaging unit 1 sequentially takes images of measurement objects (hereinafter referred to as "work piece W") of the same shape conveyed on a production line or an inspection line in a plant, and a height is measured in a predetermined measurement object region of each work piece W. The measured height information is used in positioning control of a drive system such as a robot hand or a distinction process in inspection.

The imaging unit 1 has a structure in which two cameras C0 and C1 are incorporated in a chassis 15, and the imaging unit 1 is placed above a work piece conveyance path L. The camera C0 is placed with an optical axis orientated toward a vertical direction such that an image of a top surface of the work piece W is taken from a front side. The camera C1 is placed such that an image of the work piece W is taken from obliquely above while visual fields of the cameras C0 and C1 are overlapped with each other.

Figure 2:
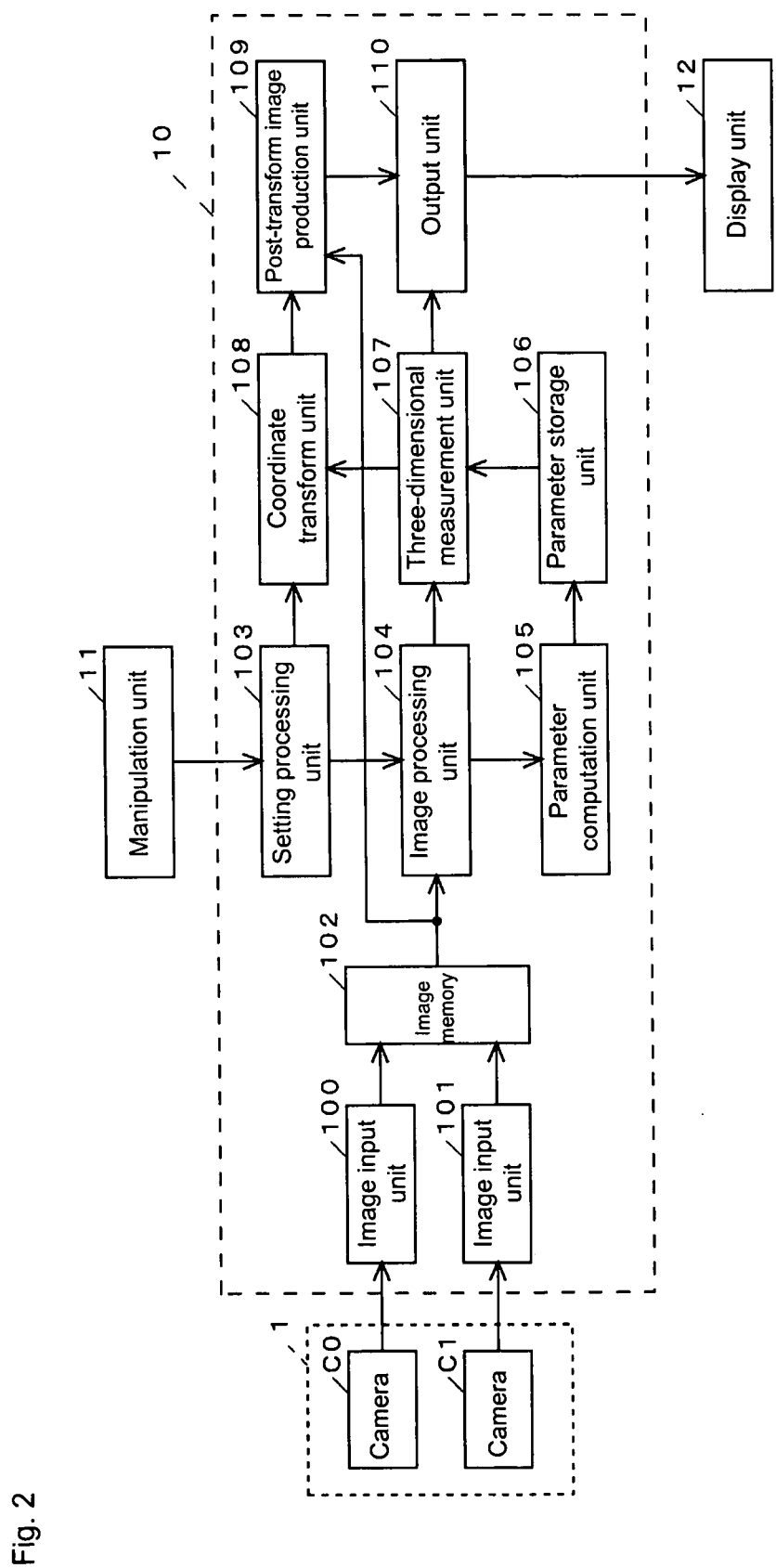
FIG. 2 shows a functional block diagram of a configuration of a three-dimensional measurement apparatus.

FIG. 2 is a functional block diagram showing an entire configuration of the three-dimensional measurement apparatus. A computer is incorporated in a control processing unit 10. In addition to the imaging unit 1, a manipulation unit 11 and a display unit 12 are connected to the control processing unit 10.

The control processing unit 10 includes image input units 100 and 101 which correspond to the cameras C0 and C1, an image memory 102, a setting processing unit 103, an image processing unit 104, a parameter computation unit 105, a parameter storage unit 106, a three-dimensional measurement unit 107, a coordinate transform unit 108, a post-transform image production unit 109, and an output unit 110. The units except for the image input units 100 and 101, the image memory 102, and the parameter storage unit 106 are functions set in a computer by a dedicated program. The dedicated program is stored in a large-capacity memory device (not shown) such as a hard disk and a flash disk. The image memory 102 and the parameter storage unit 106 are also set in the memory device.

In the image processing unit 104, the front-view image from the camera C0 is set at a reference image in extracting an object domain of the three-dimensional measurement, a predetermined measurement object region (in the embodiment, it is assumed that a domain including a feature point such as an edge constitutional point or a certain feature pattern is a measurement object region) of the work piece W is extracted to specify a coordinate for the three-dimensional measurement based on the reference image by a technique such as binarization, edge extraction, and pattern matching, and a coordinate. While the image (hereinafter referred to as "comparative image") supplied from the camera C1 is targeted, a point or a region corresponding to the measurement object region in the reference image is searched to similarly specify the coordinate for the three-dimensional measurement.

The setting processing unit 103 accept specific contents (for example, a method for extracting the measurement object region and an object range of extraction processing) of processing which should be performed by the image processing unit 104 or a manipulation for setting angle information used in perspective transform processing from a manipulation unit 11. Then, the setting processing unit 103 sets contents of the setting manipulation to the image processing unit 104 or the coordinate transform unit 108.

The three-dimensional measurement unit 107 computes three-dimensional coordinate using a coordinate of a representative point in the reference image extracted by the image processing unit 104 and a corresponding coordinate of a representative point on the comparative image side. The three-dimensional measurement unit 107 transfers the computation result to the output unit 110, and the computation result is supplied to a display unit 12 or an external device (not shown).

Plural parameters used in three-dimensional measurement processing are stored in the parameter storage unit 106. The parameters fluctuate according to a change in stereo coordinate system formed by the cameras C0 and C1 and a change in relationship (such as a distance between origins of the coordinates and a rotational shift amount of the stereo coordinate system to the spatial coordinate system) between the stereo coordinate system and a spatial coordinate system indicating a position in an actual space. The parameters are obtained by calibration in which a calibration work piece having plural feature points is used prior to the main processing. During the calibration, the image processing unit 104 performs the feature point extraction processing, and the parameter computation unit 105 performs computation to obtain the parameters.

In the embodiment, predetermined several points of the work piece W are set at the measurement object region, a height of each region is measured, and numerical information indicating the measurement result is supplied to an external device (not shown). At the same time, an image (hereinafter referred to as "processing result image") indicating the measurement result is produced and displayed on the display unit 12 in order that a user recognizes whether or not the processing is performed to the correct measurement object region or the height of the measurement object region. The image is produced based on result in which a perspective transform is performed to the front-view image (the reference image taken by the camera C0) used in the three-dimensional measurement. The coordinate transform unit 108 performs computation (equations (1) and (2) described later) for the perspective transform. Based on the computation result, the post-transform image production unit 109 produces a processing object image using the reference image in the image memory 102. The output unit 110 supplies the produced image to the display unit 12, and the image is displayed on the display unit 12.

The measurement object region and processing result image of the embodiment will be described in detail with reference to a specific example.

Figure 3:
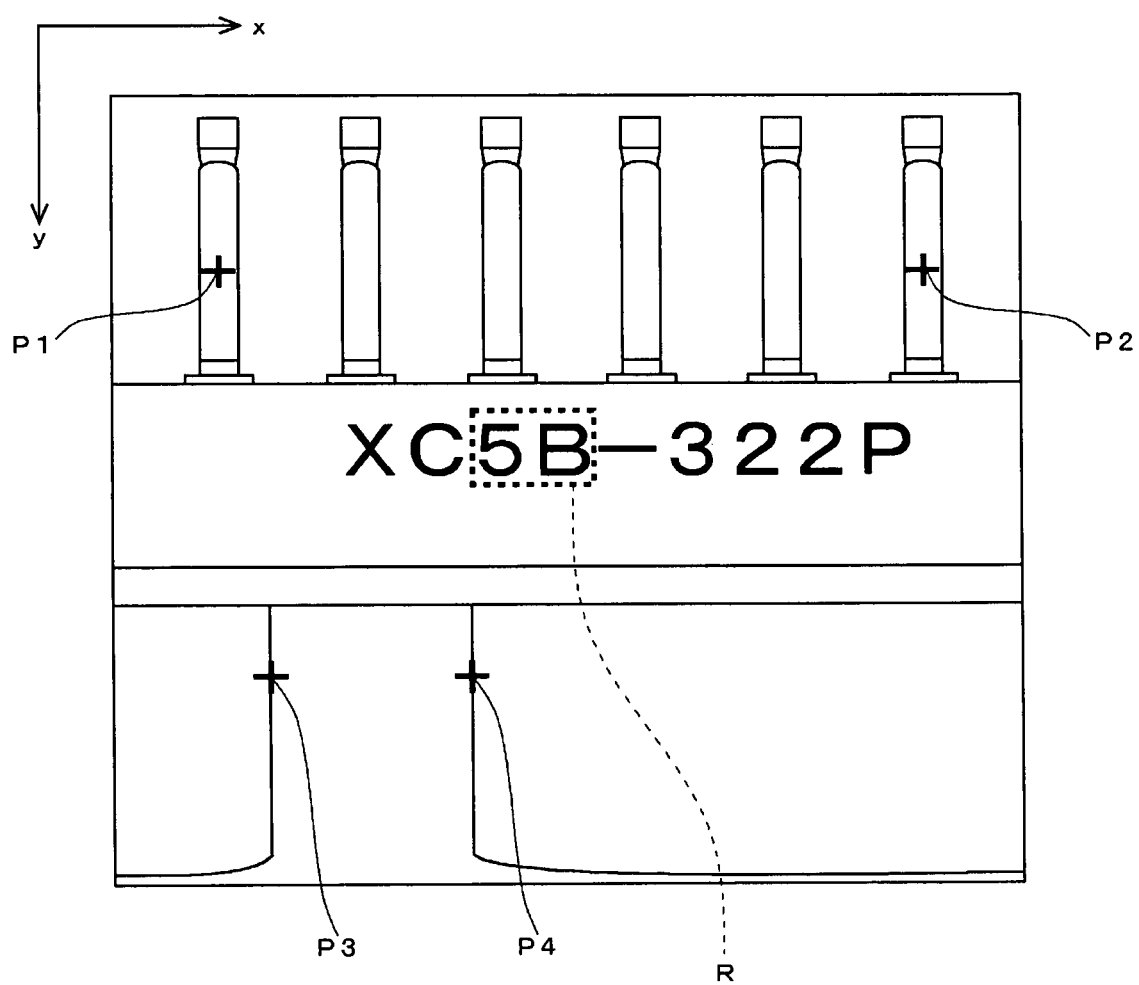
FIG. 3 shows an explanatory view of an example of a front-view image produced by a camera.

FIG. 3 shows an example of the reference image produced by the camera C0. The reference image is produced by taking an image of part of the work piece W (in this example, IC). Plural electrode pins, a character string (indicating a type number) printed in a package, and a step portion formed in the package are shown in FIG. 3. In the embodiment, a horizontal direction of the reference image is set at an x-axis direction, and a vertical direction is set at a y-axis direction.

In FIG. 3, the measurement object region is points P1 to P4 indicated by marks of "+" and a domain R indicated by a dotted-line frame. Hereinafter the points P1 to P4 and the domain R are referred to as "measurement object point" and "measurement object region".

The measurement object points P1 and P2 are constitutional points at left and right ends in six electrode pins of the image. The measurement object points P1 and P2 are extracted based on an edge generated in a lengthwise direction of the electrode pin by illumination light (not shown) or a distance from a component main body. For the sake of convenience, the number of electrode pins is limited to two in the measurement object region. However, actually at least one measurement object point is extracted in each electrode pin.

The measurement object points P3 and P4 are constitutional points at boundaries of the step portion of the package. The measurement object points P3 and P4 are also extracted by the edge extraction processing.

The measurement object region R includes character string of "5B". The measurement object region R is extracted by pattern matching in which the character string model is used.

Based on a triangulation principle, the three-dimensional measurement unit 107 computes a coordinate (z-coordinate) indicating the height for the measurement object points P1 to P4 and the measurement object region R in each set of coordinates having a correlation between the reference image produced by the camera C0 and the comparative image produced by the camera C1. For the measurement object region R, a coordinate of a center point of the domain R is extracted from each image to compute the z-coordinate, and the computed z-coordinate is applied to all the pixels in the measurement object region R.

The z-coordinate is computed while a support surface (specifically, the top surface of the work piece conveyance line) of the work piece W or a height of a virtual horizontal plane away from the support surface by a predetermined distance is set at zero. A three-dimensional coordinate system in which an x-axis and a y-axis of the reference image is combined with a z-axis indicating the height is set, and constitutional pixels of the reference image are virtually disposed in the three-dimensional coordinate system to perform the perspective transform processing, thereby producing the processing result image.

In the processing for disposing the pixels in the three-dimensional coordinate system, the coordinate (coordinate of pixel unit) of the original reference image is directly applied for the x- and y-coordinates. The z-coordinate (units of mm) computed by the height measurement is set at the pixel corresponding to the measurement object point or the measurement object region. On the other hand, assuming that the pixel out of the measurement object is located in the xy-plane, the z-coordinate of the pixel out of the measurement object is set at zero.

Figure 4:
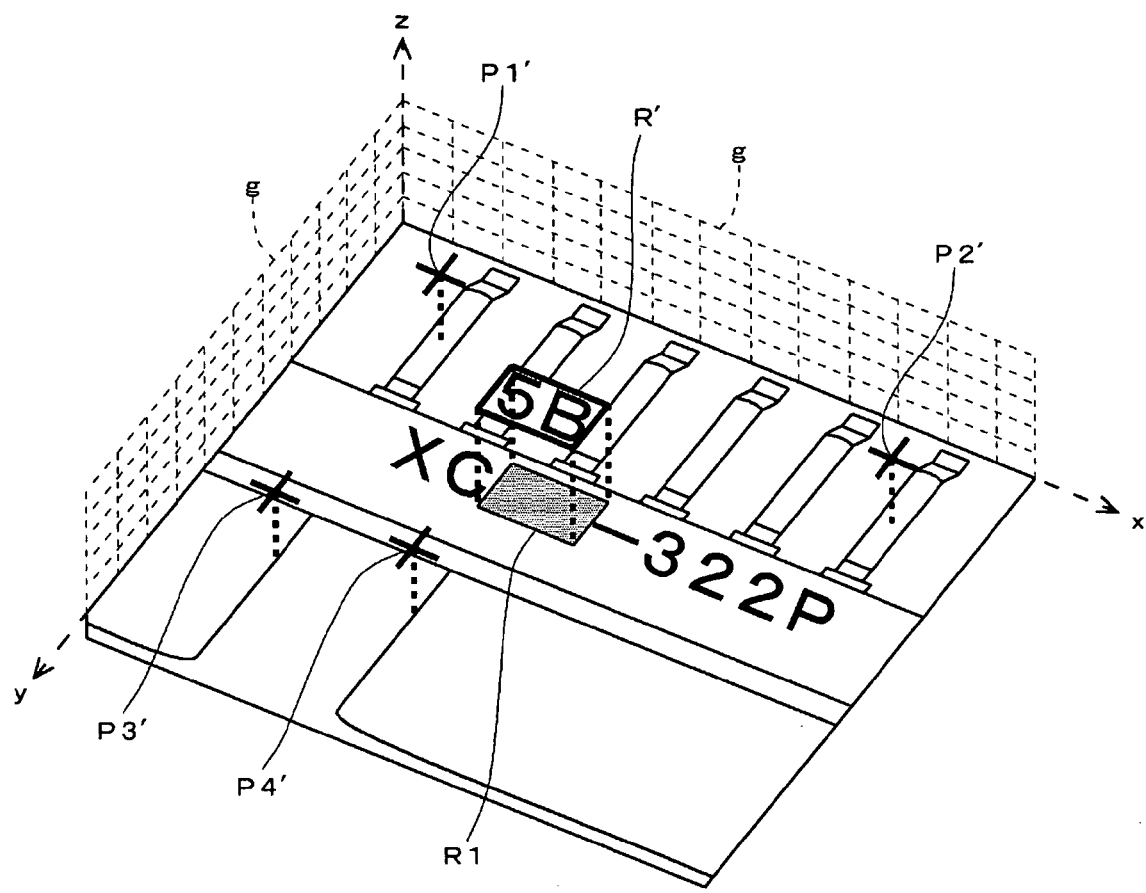
FIG. 4 shows an explanatory view of a display example of a processing result image.

FIG. 4 shows a display example of the processing result image. The processing result image of FIG. 4 shows a three-dimensional image, in which the pixels in the reference image of FIG. 3 are virtually disposed in the three-dimensional coordinate system in the above-described way and the pixel group is observed from obliquely above. Points P1' to P4' corresponding to the measurement object points P1 to P4 in the image are indicated with the mark of "+" for the sake of distinction. At the points P1' to P4', auxiliary lines (expressed by dotted lines in FIG. 4) in predetermined color are vertically raised from corresponding points in a case where the height of the measurement object point is zero. Therefore, the heights of the measurement object points P1 to P4 can be confirmed by the length of the auxiliary lines.

A domain R' corresponding to the measurement object region R is displayed at a position which is obtained based on the measured height. In FIG. 4, a corresponding domain R1 is specified in a case where the height of the measurement object region R is set at zero, and the domain R1 is marked in predetermined color (in FIG. 4, the domain R1 is expressed by a half-tone pattern). Similarly to the measurement object points P1' to P4', auxiliary lines are set between the apexes of the domain R1 and the domain R'.

Grid lines g are expressed in two sides on the depth side of the processing result image in order to express directions of the x-, y-, and z-axes and the coordinate. However, whether or not the grid line g is expressed can appropriately be selected by the manipulation unit 11.

In the image display of FIG. 4, the whole of the front-view image produced by the camera C0 is displayed while transformed into the perspective image having a depth feel, and the region which actually becomes the height measurement object is expressed at a position reflecting the measurement value along with the auxiliary lines. Therefore, the user can easily recognize whether the region to be measured is correctly measured or whether or not the measurement value is acceptable.

In the embodiment, the user sets the perspective transform direction, thereby obtaining the perspective image indicating a state in which the work piece W is observed from the desired direction.

The perspective transform direction is set by an azimuth $\theta$ and an elevation angle $\phi$ with respect to the three-dimensional coordinate system in which the pixel group is disposed. The azimuth $\theta$ is an orientation around the z-axis indicating the height. For example, the azimuth $\theta$ is expressed by an angle based on a positive direction of the x-axis. The elevation angle $\phi$ is expressed by an angle based on the xy-plane.

The user setting manipulation is not limited to the input of the specific numerical value such as the angles $\theta$ and $\phi$. For example, the x-, y-, and z-axes are displayed on the display unit 12, and the x-, y-, and z-axes are rotated by mouse drag manipulation to specify the angles $\theta$ and $\phi$ from the rotational angles.

Assuming that (x,y,z) is a position at which each pixel in the reference image is placed in the three-dimensional space and the perspective transform is performed to the pixel group from the direction expressed by the angles $\theta$ and $\phi$, a post-transform coordinate (x',y') of each pixel is computed by the following equation (1).

[Formula 1]

$$\begin{pmatrix} x' \\ y' \end{pmatrix} = \begin{pmatrix} a & c \\ b & d \end{pmatrix} \begin{pmatrix} x - x_0 \\ y_0 - y \end{pmatrix} + \begin{pmatrix} x_0 + x_t \\ y_0 + y_t - z \cdot e \end{pmatrix} \quad (1)$$

$a = -m_{xy} \cdot \sin \theta$ $b = m_{xy} \cdot \cos \theta \cdot \sin \phi$ $c = m_{xy} \cdot \cos \theta$ $d = m_{xy} \cdot \sin \theta \cdot \sin \phi$ $e = m_z \cdot \cos \phi$ The coefficients a, b, c, d, and e are described below the equation (1).

In the equation (1), $(x_0, y_0)$ is a coordinate corresponding to an origin of the three-dimensional coordinate system in the reference image. In addition, $(x_t, y_t)$ indicates a movement amount in a case where a display position of the post-transform image is moved in each of the x- and y-axes directions. $m_{xy}$ is magnification in the x- and y-axes directions of the post-transform image, and $m_z$ is magnification in the x-axis direction of the post-transform image.

Using the equation (1), each pixel virtually disposed in the three-dimensional coordinate system can be transformed into a specific one point of the two-dimensional coordinate system expressing the post-transform image.

Assuming that the z-coordinate is already known, an equation for obtaining the coordinate (x,y) of the corresponding pixel on the reference image can be derived for the coordinate (x',y') in the post-transform image by deforming the equation (1). The specific operational expression is obtained as an equation (2).

[Formula 2]

$$\begin{pmatrix} x \\ y \end{pmatrix} = \frac{1}{ad-bc}\begin{pmatrix} d & -c \\ b & -a \end{pmatrix}\begin{pmatrix} x'-x_0-x_t \\ y'-y_0-y_t+z\cdot e \end{pmatrix} + \begin{pmatrix} x_0 \\ y_0 \end{pmatrix} \quad (2)$$

Figure 5:
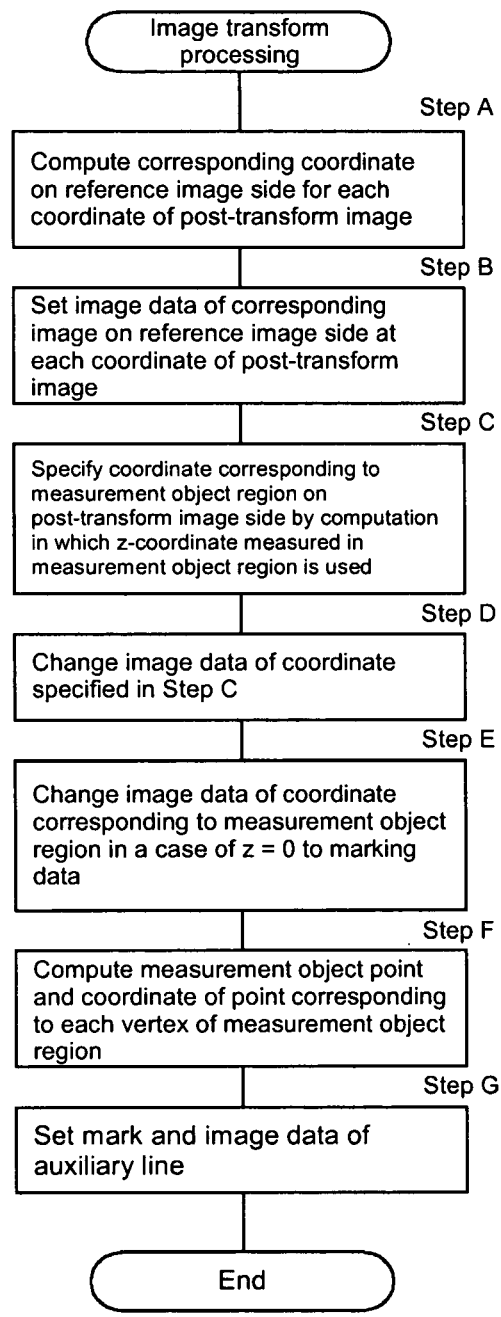
FIG. 5 shows a flowchart of a procedure of image transform processing.

FIG. 5 shows a procedure of processing for producing the processing transform image of FIG. 4 using the reference image of FIG. 3.

In the processing of FIG. 5, the perspective transform processing is performed to the whole of the reference image. Specifically, in a case of z=0, the equation (2) is performed to each coordinate (x',y') of the post-transform image, thereby computing the coordinate (x,y) corresponding to the coordinate (x',y') on the reference image side (Step A). Then, image data of the corresponding coordinate on the reference image side specified by the computation is set at each coordinate of the post-transform image (Step B). The reference image expressing a front-view state can be transformed into the image expressing the perspective view through the pieces of processing in Step A and B.

In Step C, the z-coordinate measured for the measurement object region R is plugged into z in the equation (2) and, similarly to Step A, the equation (2) is performed in each pixel of the post-transform image using the coordinate (x',y'). When the coordinate (x,y) obtained by the computation is matched with the coordinate in the measurement object region on the reference image side, the coordinate (x',y') plugged in the computation is specified as the coordinate corresponding to the measurement object region R. In Step D, the image data of each coordinate specified in Step C is changed to image data of the corresponding pixel (pixel having the coordinate (x,y) computed by the computation in Step C) on the reference image side.

The image of the measurement object region in the post-transform image can be moved to the position according to the measured height through the pieces of processing in Steps C and D.

In Step E, in the case of z=0, using the computation result in Step A again, the coordinate corresponding to the measurement object region is specified in the post-transform image, and image data of each specified coordinate is replace for data indicating a marking color.

In Step F, the equation (1) in which the coordinate (x,y) on the reference image side is used is performed to the measurement object point and each vertex of the measurement object region to obtain the coordinate (x',y') of the corresponding point in the post-transform image. At this point, the computation in which the measured z-coordinate is plugged and the computation in which z is set at zero are performed to each point.

In Step G, based on the computation result in Step F, the mark of "+" indicating the corresponding point based on the measured z-coordinate and the image data of the auxiliary line connecting the corresponding point indicated by the mark of "+" and the corresponding point in the case of z=0 are set into the post-transform image.

In the processing of FIG. 5, the corresponding pixel in the pre-transform reference image is specified for each pixel of the post-transform image using the equation (2), and the image data of the corresponding pixel is plugged. Therefore, even if the image enlarged with the magnifications $m_y$ and $m_z$ is produced, the image data can substantially be set at all the pixels to stabilize the image accuracy.

The manipulation for setting the azimuth θ and the elevation angle φ used in the transform is performed in teaching prior to the main processing while the front-view image of the model of the work piece W is displayed. After the processing object image is displayed in the main processing, the manipulation for changing the angles θ and φ can be accepted to change the display of the processing object image.

Because the plane corresponding to the front-view image corresponds to the xy-plane of the virtual three-dimensional coordinate system, it can be interpreted that the angles θ and φ correspond to the post-change direction when the user changes a front-view visual line to an oblique direction. Because the perspective view close to the image which is taken from the observation direction assumed by the user can be displayed, the direction suitable to the confirmation of the measurement result can easily be determined to perform the setting operation.

Figure 6:
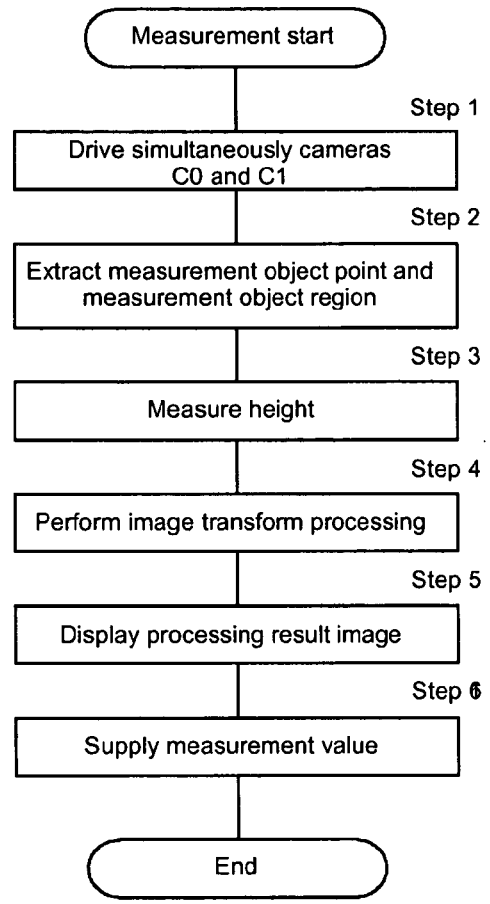
FIG. 6 shows a flowchart of a procedure of a measurement process.

FIG. 6 shows a flow of a processing performed to one work piece W.

The processing of FIG. 6 is started by conveying the work piece W of the measuring object into an imaging object range of the cameras C0 and C1. In Step 1, the cameras C0 and C1 are simultaneously driven to produce the reference image and the comparative image.

In Step 2, the measurement object point and the measurement object region are extracted from the reference image by the various pieces of image processing, and the coordinates used in the height measurement are specified for the measurement object point and the measurement object region. The point and domain corresponding to the measurement object point and measurement object domain are extracted from the comparative image, and the coordinates used in the height measurement are specified.

In Step 3, the z-coordinate indicating the height is computed by performing the computation with the parameters in each corresponding coordinate between the images.

In Step 4, the processing result image is produced by the image transform processing of FIG. 5. The produced processing result image is displayed (Step 5), and the height measurement value is supplied (Step 6). Then, the processing is ended.

In the embodiment, for the measurement object domain, the z-coordinate computed with the coordinate of the center point of the domain is expressed as the height of the whole region. Alternatively, the height may individually be measured for the plural representative points included in the domain having a predetermined area to display the processing result image reflecting the measurement result.

Figure 7:
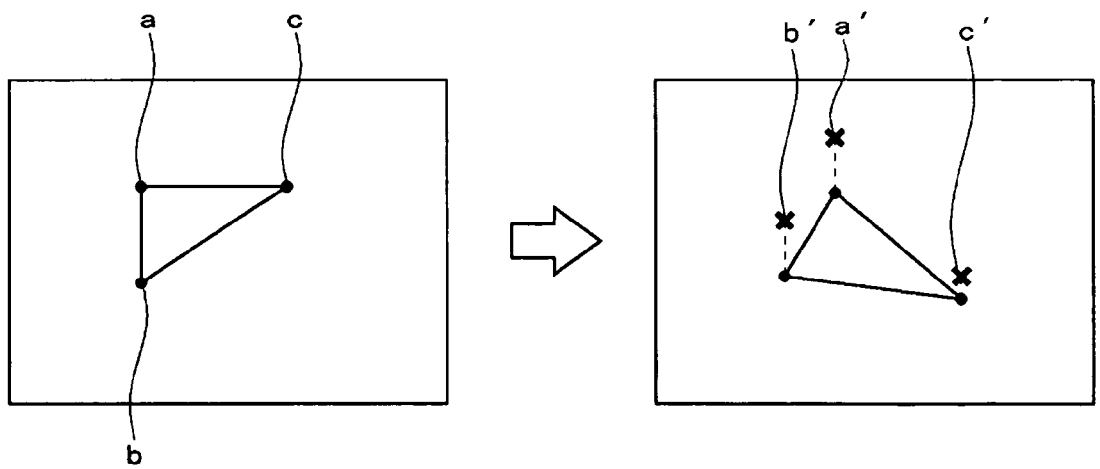
FIG. 7 shows an explanatory view of another example of an image transform.

FIG. 7 shows an example, in which the heights measurement is performed to the apexes a, b, and c of a triangular domain and the perspective transform is performed to the apexes a, b, and c based on the x- and y-coordinates in the reference image and the measured z-coordinate. In the image of FIG. 7, the apexes a, b, and c are respectively transformed into corresponding points a', b', and c' specified by the equation (1), and the auxiliary lines similar to those of FIG. 4 are set to express the measured height of each point. On the other hand, the image of the whole domain is projected to a predetermined range by performing the equation (2) in the case of z=0.

In the example of FIG. 7, because the auxiliary line at the point c' is shorter than other auxiliary lines, it can be recognized that the point c is lower than the points a and b. The display of FIG. 7 can indicate the processing result image suitable to the confirmation of inclination of a particular surface or existence of irregularity.

In this kind of measurement, not only the measurement object is higher than the reference plane, but also sometimes a portion recessed from the surroundings is measured. In performing the measurement of the portion recessed from the surroundings, the processing result image can be produced and displayed by the similar perspective transform processing.

Figure 8:
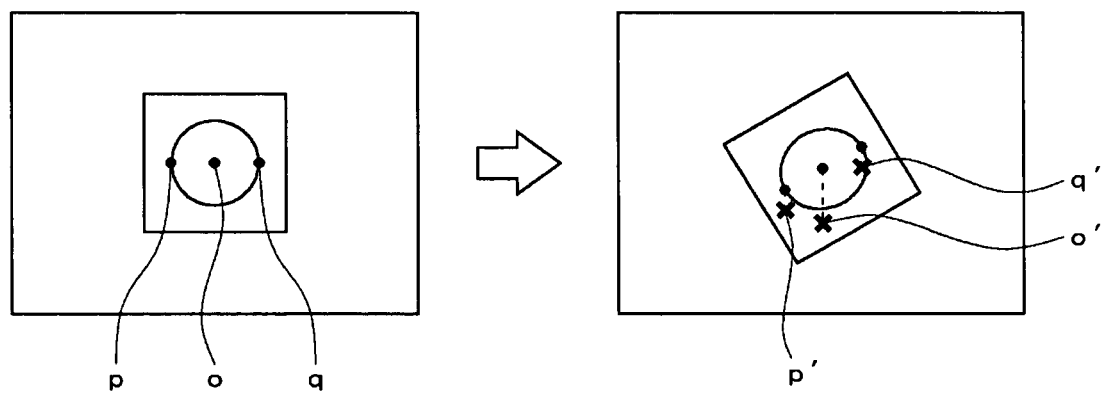
FIG. 8 shows an explanatory view of another example of the image transform.

FIG. 8 shows an example in which the measurement object is a hemispherical recess formed in a square case body.

In the example of FIG. 8, a pair of edge points p and q which faces each other in a radial direction is extracted from an edge indicating an outer circumference of the recess, the points p and q and a point o (mid point of a line segment pq) corresponding to the center point of the recess are set at the measurement object point to compute the z-coordinate of each point. The computed z-coordinates are plugged in the measurement object points, and corresponding points o', p', and q' are obtained in the post-transform image using the equation (1). On the other hand, a constant value which is of the z-coordinate larger than zero is plugged in all the pixels, and the whole of the reference image is transformed by the perspective transform processing based on the equation (2).

For example, a typical height of the case body which is of the constant z-coordinate can be plugged in each pixel. A measurement object point is also provided outside the recess to measure the z-coordinate, and the measured value may commonly be set at the pixels.

In the example of FIG. 8, the perspective image of the whole case body is displayed by the transform processing, the corresponding points o', p', and q' are displayed at positions corresponding to the measured z-coordinate for the measurement object points o, p, and q, and the auxiliary line indicating the height is set.

In the display of FIG. 8, how mach the center point o of the recess falls down with respect to the outer circumference or whether or not the object region is correctly measured can easily be confirmed.

In the embodiment, the processing result image indicating the measurement result of the region used to actually compute the z-coordinate is displayed using the image used in the three-dimensional measurement processing in which the stereo camera is used. In the three-dimensional measurement method except for the stereo method, when the pixel corresponding to the measurement object region can be specified, the similar processing result image can be measured and displayed.

Figure 9:
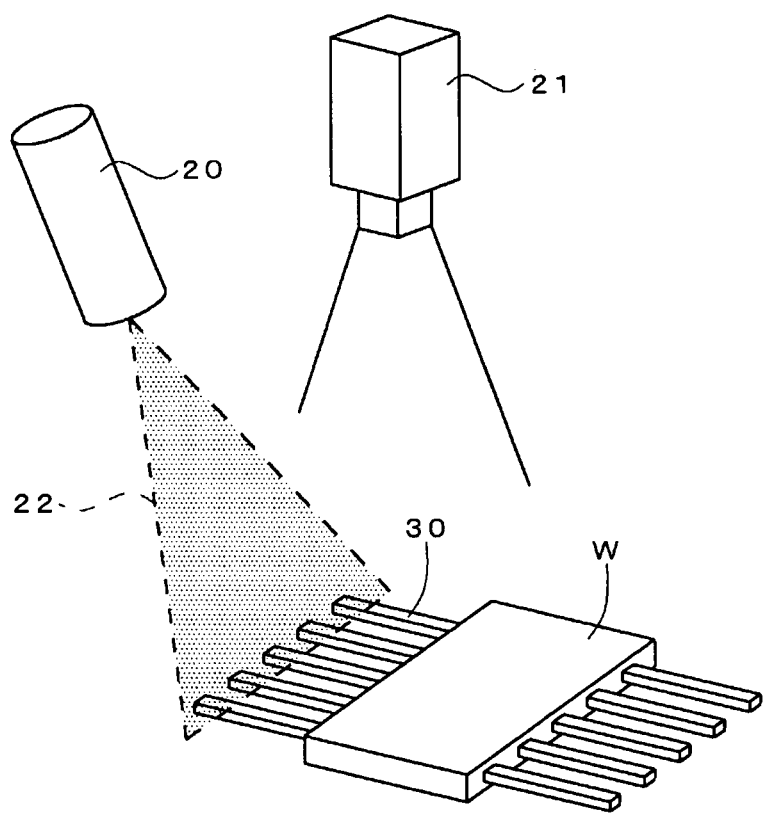
FIG. 9 shows an explanatory view of another configuration example and a measurement example of the three-dimensional measurement apparatus.

FIG. 9 shows a configuration example of a three-dimensional measurement apparatus which can display the processing result image similar to the above-described examples.

The apparatus of FIG. 9 measures the height by a light-section method. The apparatus includes a floodlighting unit 20 which irradiates a measurement object with a laser slit light 22, a two-dimensional camera 21, and a control processing unit (not shown). The work piece W is IC, and the measurement object is electrode pins 30.

Similarly to the camera C0 of the embodiment, the camera 21 is placed with the optical axis orientated toward the vertical direction such that the front-view image of the work piece W is produced. The floodlighting unit 20 is disposed obliquely above the work piece W to irradiates the electrode pins 30 with the slit light 22 along a direction in which the electrode pins 30 are arranged.

The control processing unit extracts a light-beam image of the reflected light of the slit light 22 from the image produced by the camera 21, and the control processing unit sets plural points included in the light-beam image at the measurement object points to plug the coordinates of the measurement object points in the predetermined operational expression, thereby computing the height corresponding to each measurement object point.

In the example of FIG. 9, the height measurement is performed while the predetermined pixel in the front-view image of the work piece W is set at the measurement object point, so that the pixel used in the measurement can be transformed into the position corresponding to the measured height in the front-view image used in the measurement. Accordingly, although the light-section method differs from the stereo method in the three-dimensional measurement technique, similarly to the three-dimensional measurement apparatus in which the stereo method is adopted, the processing result image can be produced and displayed.

What is claimed is:

1. A three-dimensional measurement method for observing a measurement object, in which one or a plurality of measurement object regions are previously defined, with an optical three-dimensional measurement unit to compute a coordinate for each measurement object region, the coordinate indicating a position relative to a predetermined reference plane facing at least the measurement object region, the three-dimensional measurement method comprising:
taking an image of the measurement object to produce a two-dimensional image;
setting a coordinate at a pixel corresponding to the measurement object region in the two-dimensional image, the coordinate indicating the position relative to the reference plane;
setting a constant value at another pixel, the constant value being of the coordinate indicating the position relative to the reference plane;
virtually disposing each of the set pixels in a three-dimensional space, the three-dimensional space being formed by two axes constituting a coordinate system of the two-dimensional image and an axis indicating the position relative to the reference plane;
performing a perspective transform of each pixel from a predetermined direction by determining apexes of the two-dimensional image and performing the perspective transform to the determined apexes; and
processing and displaying a two-dimensional image produced by the perspective transform such that the measurement object region can be distinguished from another region,
wherein a height of each of the set pixels is determined and virtually displayed in the three-dimensional space based on a distance of each of the set pixels from a closest one of the determined apexes.

2. The three-dimensional measurement method according to claim 1, wherein a front-view image which is produced by taking an image of the measurement object from a front direction is set at the perspective transform object image,
a manipulation for setting a perspective transform direction based on a front-view direction is accepted while the front-view image is displayed, and the perspective transform is performed to a pixel group from a direction indicated by an angle set by the manipulation, the pixel group being virtually disposed in the three-dimensional space.

3. The three-dimensional measurement method according to claim 1, wherein, after a coordinate corresponding to each measurement object region is specified in a plurality of two-dimensional images with an apparatus which of the optical three-dimensional measurement unit for performing three-dimensional measurement using the plurality of two-dimensional images produced by a plurality of cameras, a coordinate indicating a position relative to the reference plane is computed using the specified coordinate, and for one of the two-dimensional images used in the three-dimensional measurement, the coordinate computed as a coordinate indicating a position relative to the reference plane is set at a pixel whose coordinate is specified as the coordinate corresponding to the measurement object region, the constant coordinate is set at other pixels as a coordinate indicating a position relative to the reference plane, and the perspective transform processing is performed.

4. A three-dimensional measurement apparatus comprising:

a plurality of cameras which are disposed while a positional relationship and an optical axis direction are defined such that visual fields of the cameras are overlapped in a predetermined range;

an image input unit into which a plurality of two-dimensional images are fed, the plurality of two-dimensional images being produced by taking an image of a measurement object entering the range where the visual fields of the cameras are overlapped using the cameras;

a measurement unit which extracts a coordinate of a corresponding point in each input image for predetermined one or a plurality of measurement object regions of the measurement object, and the measurement unit computing a coordinate indicating a position relative to a reference plane facing at least the measurement object region using each extracted coordinate;

a processing result image production unit which produces a two-dimensional processing result image expressing the measurement result of the measurement unit; and a display unit which displays the processing result image, wherein, for a specific image in a plurality of two-dimensional images used to measure by the measurement unit, the processing result image production unit sets the coordinate computed as the coordinate indicating the position relative to the reference plane at a pixel whose coordinate corresponding to the measurement object region is extracted by the measurement unit in each constitutional pixel in the specific image, the processing result image production unit sets a constant value as the coordinate indicating the position relative to the reference plane at other pixels, the processing result image production unit virtually disposes the set pixels in a three-dimensional space, the three-dimensional space including two axes constituting a coordinate system of the specific image and an axis indicating the position relative to the reference plane, and the processing result image production unit performs the perspective transform to each pixel from the predetermined direction by determining apexes of the two-dimensional image and performing the perspective transform to the determined apexes, and processes the perspective transform image such that the measurement object region can be distinguished from other regions to produce a processing result image, wherein a height of each of the set pixels is determined and virtually displayed in the three-dimensional space based on a distance of each of the set pixels from a closest one of the determined apexes.

5. The three-dimensional measurement apparatus according to claim 4, further comprising a manipulation unit which performs manipulation for setting an angle indicating a perspective transform direction based on a front-view direction while a specific one of the plurality of cameras is disposed so as to take an image of the measurement object from the front-view direction, wherein the processing result image production unit displays a front-view image of a measurement object produced by the specific camera on the display unit, the processing result image production unit accepts setting manipulation of the manipulation unit while the front-view image is displayed on the display unit, and the processing result image production unit performs the perspective transform to a pixel group virtually disposed in the three-dimensional space from a direction indicated by the angle set by the manipulation.

6. The three-dimensional measurement method according to claim 1, wherein the predetermined direction of the perspective transform of each pixel is set by an azimuth $\theta$ and an elevation angle $\phi$ with respect to a three-dimensional coordinate system of the three-dimensional space.

7. The three-dimensional measurement method according to claim 6, further comprising:

receiving a user selection of the azimuth $\theta$ and the elevation angle $\phi$ for the predetermined direction of the perspective transform based on a mouse drag manipulation made by the user.

8. The three-dimensional measurement method according to claim 1, wherein the two-dimensional image produced by the perspective transform is displayed such that the measurement object region is displayed in a three-dimensional perspective view using a different color with respect to another region having a same two-dimensional coordinate but a different third dimension coordinate.

9. The three-dimensional measurement apparatus according to claim 4, wherein the predetermined direction of the perspective transform of each pixel is set by an azimuth $\theta$ and an elevation angle $\phi$ with respect to a three-dimensional coordinate system of the three-dimensional space.

10. The three-dimensional measurement apparatus according to claim 9, wherein the user input unit receives a user selection of the azimuth $\theta$ and the elevation angle $\phi$ for the predetermined direction of the perspective transform based on a mouse drag manipulation made by the user and detected by the user input unit.

11. The three-dimensional measurement apparatus according to claim 4, wherein the two-dimensional image produced by the perspective transform is displayed such that the measurement object region is displayed in a three-dimensional perspective view using a different color with respect to another region having a same two-dimensional coordinate but a different third dimension coordinate.

* * * * *